United States Patent [19]

Nishino et al.

[11] Patent Number: 5,682,314
[45] Date of Patent: Oct. 28, 1997

[54] CONTROLLER APPARATUS FOR VEHICLE

[75] Inventors: Kazuhisa Nishino; Yuji Takatsuka; Shunichi Wada, all of Hyogo, Japan

[73] Assignee: Mitsubishi Denki Kabushiki Kaisha, Tokyo, Japan

[21] Appl. No.: 407,851

[22] Filed: Mar. 21, 1995

[30] Foreign Application Priority Data

Nov. 10, 1994 [JP] Japan ................... 6-276541

[51] Int. Cl.⁶ ..................... G60K 26/02; G06F 1/24
[52] U.S. Cl. ............... 364/424.034; 364/424.035; 364/431.11; 364/184; 395/182.21; 395/183.12
[58] Field of Search ............ 364/424.03, 424.05, 364/431.1, 431.11, 184, 424.034, 424.035, 424.036, 424.039, 424.053; 395/182.21, 183.12, 184.01, 185.08, 375; 180/443, 446

[56] References Cited

U.S. PATENT DOCUMENTS

| | | | |
|---|---|---|---|
| 4,696,002 | 9/1987 | Schleupen et al. | 395/182.21 |
| 4,868,817 | 9/1989 | Shigihara | 395/184.01 |
| 4,879,647 | 11/1989 | Yazawa | 395/375 |
| 4,951,210 | 8/1990 | Fukami | 364/431.11 |
| 5,303,156 | 4/1994 | Matsuoka et al. | 364/424.05 |
| 5,351,185 | 9/1994 | Takeuchi et al. | 364/184 |
| 5,360,077 | 11/1994 | Nishimoto et al. | 180/446 |
| 5,404,356 | 4/1995 | Abe | 395/185.08 |
| 5,408,643 | 4/1995 | Katayose | 395/185.08 |
| 5,408,648 | 4/1995 | Gokan et al. | 395/182.21 |
| 5,454,113 | 9/1995 | Graf et al. | 395/750 |

FOREIGN PATENT DOCUMENTS 5185937  7/1993  Japan.

*Primary Examiner*—Kevin J. Teska
*Assistant Examiner*—Tan Nguyen
*Attorney, Agent, or Firm*—Sughrue, Mion, Zinn, Macpeak & Seas, PLLC

[57] ABSTRACT

A controller apparatus for a vehicle includes a computer for controlling devices mounted in the vehicle, and a detector means for detecting the state of the computer immediately before the computer enters a reset state. The computer determines its processing contents on the basis of the detection result of the detection means immediately after the computer is started. Thus, the controller apparatus detects the abnormal reset of the computer in control, thereby assuring the safe control of the devices.

10 Claims, 15 Drawing Sheets

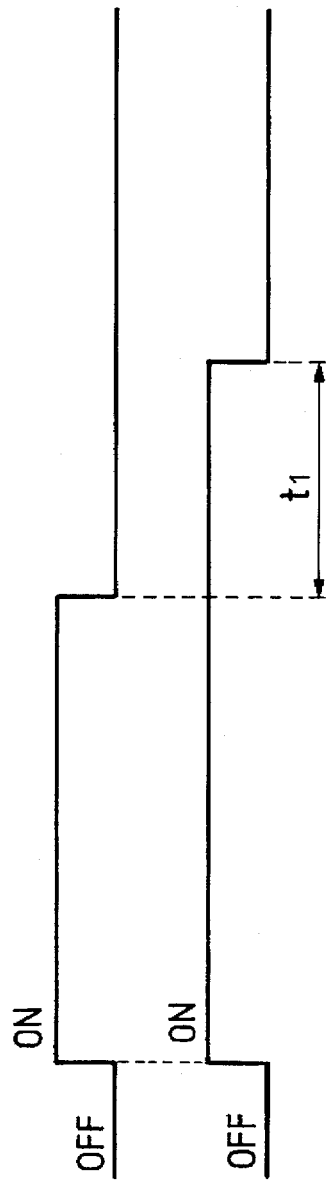
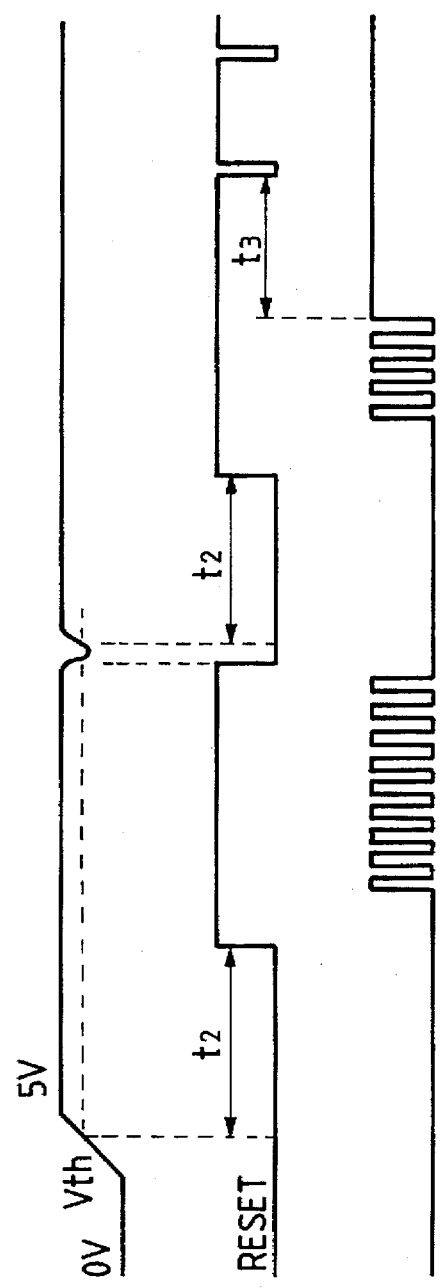
FIG. 2A
FIG. 2B
FIG. 3A
FIG. 3B
FIG. 3C

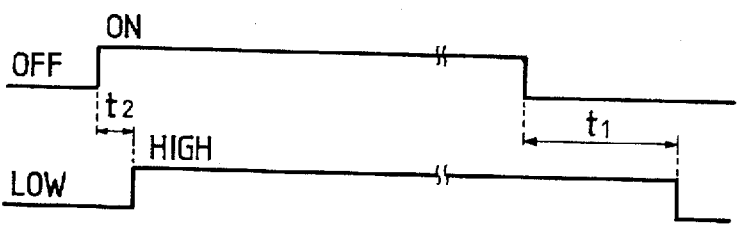
FIG. 16A
FIG. 16B
FIG. 16C
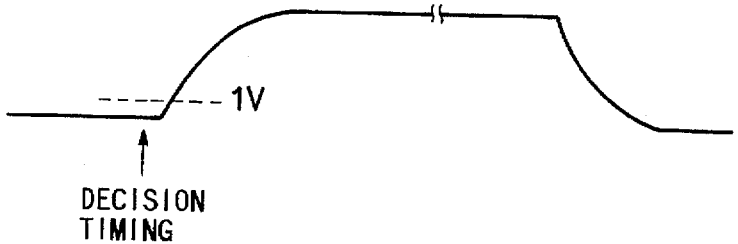
FIG. 16D
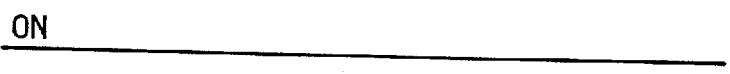
FIG. 17A
FIG. 17B
FIG. 17C
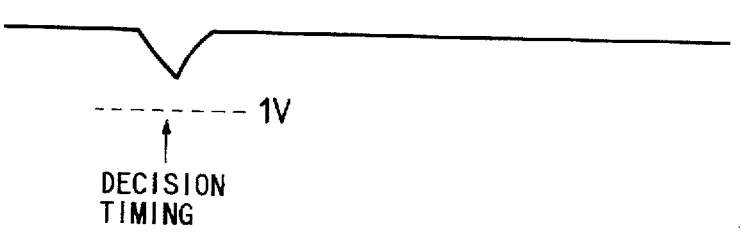
FIG. 17D 5,682,314

1

CONTROLLER APPARATUS FOR VEHICLE

BACKGROUND OF THE INVENTION

The present invention relates to a reset procedure of a computer for controlling devices mounted in a vehicle, and more particularly to a technique of detecting abnormal reset that the computer is reset when a power supply voltage is lowered owing to failure of a controller such as a power steering controller during control, and suitably coping with such abnormal reset.

For example, Unexamined Japanese Patent Publication (Kokai) Hei-5-185973 discloses a technique in which the voltages at both terminals of a motor for assisting the operation of steering is detected so as to detect ground fault of a motor wire during motor driving, and then turning off all the switching elements for motor driving when the ground fault relative to a motor line is detected.

In the above publication, it is also disclosed to detect initial ground fault in a state where all the switching elements are turned off before the driving of the motor is started.

However, the above prior arts have the following defects.

When the ground fault relative to a motor line occurs, an excess current flows so that the voltage of a battery will be greatly lowered. In this case, a computer may be reset before abnormality is detected. Therefore, it was difficult to detect the ground default surely.

The controller apparatus which is constructed so as to detect initial ground fault after a relay is turned on as described in the above publication can detect ground fault through the initial ground fault even when the reset of the computer occurs owing to the ground fault relative to the motor line. However, a transistor arranged between a motor terminal connected to the motor line subjected to ground fault and a battery is short-circuited and broken because of the ground fault current when the ground fault occurs. In such case, an excess current flows when the relay is turned on, thus resetting the computer.

Therefore, where occurrence of ground fault leads to short-circuit and breakdown of a transistor, the computer only repeats its reset and cannot detect the ground fault to prevent abnormal operation. Further, the excess current which is generated repetitively gave rise to inconvenience such as fluctuation in a battery voltage, breakdown in the controller apparatus and deterioration of the battery.

Also in the case where the controller apparatus is so constituted that the ground fault relative to the motor line is detected during motor driving, the computer may be reset before the ground fault is detected for the same reason. So in this case also, the above inconvenience occurred.

Further, even if the controller apparatus is constituted to detect the ground fault relative to the motor lines when the relay is in off state, in the case of double fault where the ground fault cannot be detected because of abnormality of a ground fault detector, it may be detected as "normal" even when the ground fault relative to the motor line occurs and thus starting motor control. In this case also, for the reason described above, reset of the computer may be repeated so that the inconvenience described above occurs.

The above prior art requires a circuit for detecting the ground fault of the motor line, which is accompanied by redundant cost.

Further, in the case of where the initial ground fault detection is performed before the motor is driven, since the initial ground fault detection intends to detect the abnormality of a motor line after all the switching elements are turned off, for example, when the computer is reset by accidental noise from outside during high speed running and steering, supplemental force of steering will be lost, thus greatly deteriorating safety.

SUMMARY OF THE INVENTION

The present invention has been completed in order to solve the above problems.

An object of the present invention is to provide a control apparatus for a vehicle which can detect abnormal reset of a computer in control surely to perform more safe control of the devices mounted in the vehicle.

In order to achieve the above object, the control apparatus according to the present invention comprises a computer for controlling devices mounted in a vehicle, and a detector for detecting the state of the computer immediately before the computer enters a reset state.

The controller apparatus according to the present invention comprises state detecting means for storing a first value while the computer is in control and changing the first value into a second value to be stored, and state deciding means for deciding whether or not the computer in control is reset on the basis of the value stored in the state detecting means.

Further, the operation of the computer is stopped after the state detecting means has changed the first value into the second value when an ignition switch is turned off.

Furthermore, a plurality of state detecting means are provided.

Moreover, the controller apparatus according to the present invention comprises stopping means for stopping the control of the control when the computer is reset a predetermined number of times.

Still further, the controller apparatus according to the present invention comprises initial abnormality detecting means for detecting the presence or absence of the abnormality apparatus before control is started.

The control apparatus according to the present invention comprises a running state detecting means which detects a predetermined running state and in other states than the predetermined state, starts the control through an initial abnormality detecting means even when it is decided that the reset has been performed during the control.

The controller apparatus according to the present invention comprises plural storage means for storing plural control values for the devices mounted in a vehicle and storage decision means for deciding whether or not the storage contents of the plural storage means are correct and starting the control through the initial abnormality detecting means when it is decided that any one of the storage contents is erroneous.

The controller apparatus according to the present invention comprises failure decision means for deciding whether or not the devices mounted in vehicle can be controlled, inhibiting means for inhibiting the control of the devices when failure is decided by the failure decision means, and decision result storage means for storing said decision result.

The controller apparatus according to the present invention comprises a computer for controlling devices mounted in the vehicle, integrating means for starting charging simultaneously with the start of control of the devices and starting discharging simultaneously with the completion of control of the devices, and state decision means for deciding whether or not a computer has been reset in control on the basis of the output from the integrating means after a predetermined time from when the computer has been started.

In the controller apparatus according to the present invention, the reset which has been generated by an ignition switch, accidentally or owing to the abnormality of devices is decided to determine the processing procedure of a computer after its starting. Otherwise, the processing before having been reset is continued. For this reason, the influence of abnormal reset on control can be minimized.

In the controller apparatus according to the present invention, the reset of the computer in control is decided on the basis of the values of the state detecting means. For this reason, the reset of the computer in control can be detected surely.

In the controller apparatus according to the present invention, the operation of the computer is stopped after the state detecting means has changed the first value into the second value. Therefore, it can be detected that the stop of the computer operation is due to the turn-off of the ignition switch.

In the controller apparatus according to the present invention, plural detecting means are prepared so that the reset of the computer in control can be detected surely with no erroneous decision.

In the controller apparatus according to the present invention, in the case of the accidental or single reset of the computer in control, the control is continued so that any wasteful protection operation can be prevented.

In the controller apparatus according to the present invention, when it is decided that the computer in control has not been yet reset, the control is started through an initial abnormality detection means. Therefore, the presence or absence of abnormality can be detected before the control of devices to protect the control apparatus.

An accident which has occurred at the time except while the devices are controlled can be detected before the control of the devices to protect the controller apparatus.

In the controller apparatus according to the present invention, control is started through an initial abnormality detecting means even when the reset of the computer in control except the predetermined running state, thus improving the safety of the controller apparatus.

In the controller apparatus according to the present invention, control is started through the initial abnormality detecting means when it is decided that any one of the storage contents of plural storage means is erroneous. For this reason, it does not occur that the initial abnormality detection operation for devices is omitted because of the erroneous decision.

In the controller apparatus according to the present invention, as soon as fault of devices is decided by the fault decision means, the control of devices is inhibited and the result of decision is stored. Therefore, redundant control will not be performed and the safety of the controller apparatus can be improved.

In the controller apparatus according to the present invention, it is decided whether or not the computer in control has been reset on the basis of the integration output from integration means after a predetermined time from when the computer is started. It can be decided whether or not the computer in control has been reset without the aid of storage means.

Further, where the controller apparatus does not operate for a long time because of a long time of the reset of the computer in control, because of influence by the reset, the control cannot be started immediately after the computer is started. However, in the controller apparatus according to the present invention, since the reset time can be detected, the initial abnormality detection in which abnormality of devices is detected before the control is started can be performed.

The above and other objects and features of the present invention will be more apparent from the following description taken in conjunction with the accompanying drawings.

BRIEF DESCRIPTION OF THE DRAWINGS

FIGS. 2A and 2B are timing charts showing the operation of the timer circuit;

FIGS. 3A to 3C are timing charts showing the operation of the reset circuit;

FIGS. 16A to 16D and 17A to 17D are timing charts showing the operation of an integration circuit, respectively.

DESCRIPTION OF THE PREFERRED EMBODIMENTS

Embodiment 1

The first embodiment intends to detect whether or not a computer in control has been reset.

Figure 1:
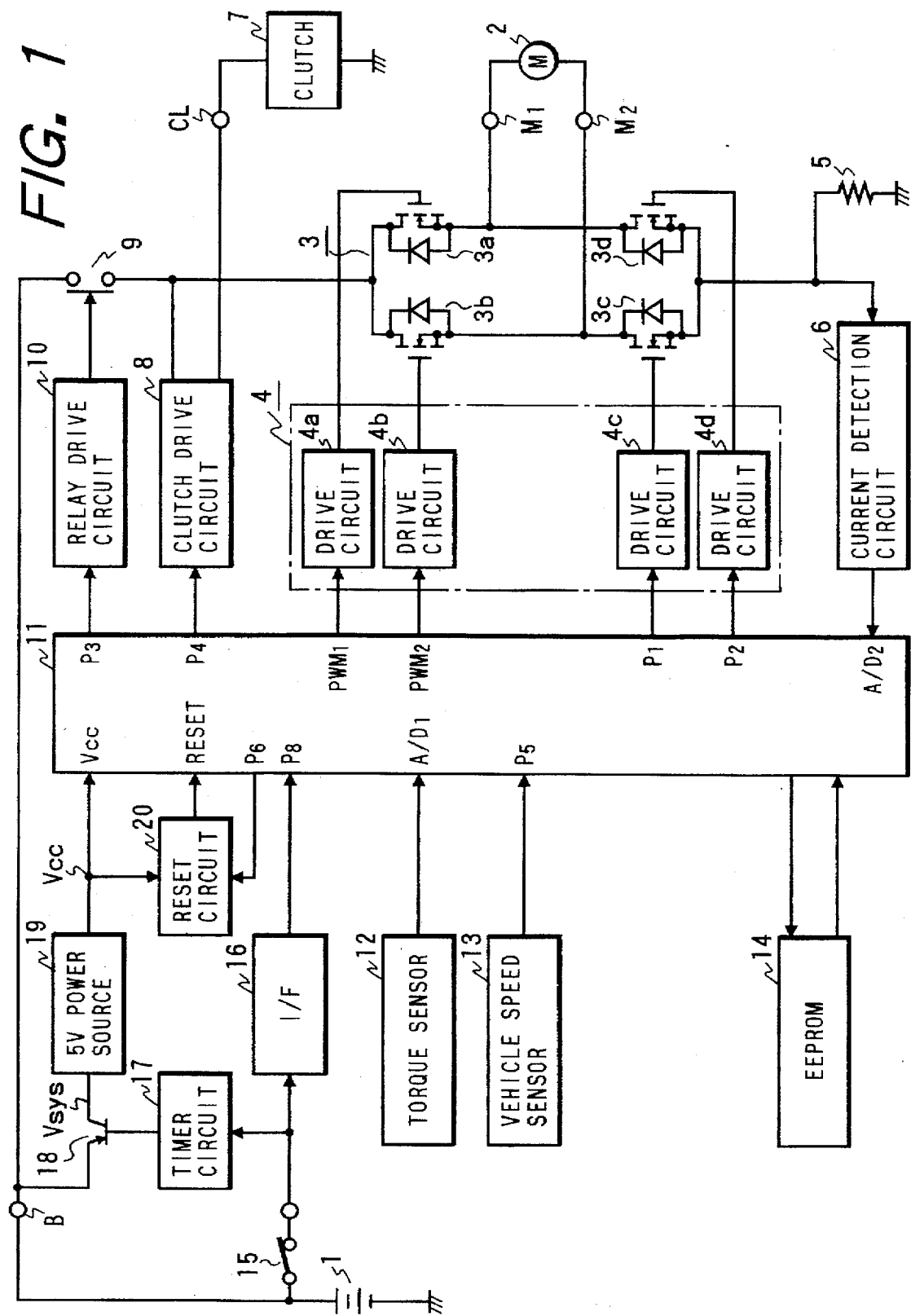
FIG. 1 is a block diagram of the circuit configuration of the controller apparatus for a vehicle according to the first to third embodiments of the present invention.

FIG. 1 is a block diagram showing the circuit configuration of the control apparatus according to the first to third embodiment of the present invention. In these embodiments, as an example of the controller apparatus for a vehicle, a power steering control apparatus for controlling the power steering device will be described. In FIG. 1, reference numeral 1 denotes a battery which is a power source for driving a power steering control device mounted in a vehicle; 2, a DC motor which is an electric motor supplied with a current from the battery and assisting the handling of the steering (not shown); 3, a bridge circuit composed of transistors 3a to 3d serving as switching elements arranged on the current supply path between the battery 1 and the motor 2; 4, a drive circuitry composed of drive circuits 4a to 4d which drive the transistors 3a to 3d, respectively; 5, a shunt resistor the one end and the other end of which are connected to the bridge circuit 3 and ground, respectively and serves to detect the current supplied to the motor 2; 6, a current detection circuit for detecting the current flowing through the motor on the basis of the voltage generated at the one end of the shunt resistor 5; 7, a clutch for mechanically connecting or separating the motor 2 and steering system (not shown); 8, a clutch driving circuit for driving the clutch 7; 9, a relay which is arranged between the battery 1 and the bridge circuit 3 and serves to pass or intercept the current from the battery; and 10, a relay driving circuit for driving the relay 9.

Further, in FIG. 1, reference numeral 11 denotes a microcomputer which serves as a computer for controlling a power steering and serves to control the above drive circuitry 4, clutch driving circuit 8, relay driving circuit 10, etc. on the basis of several items of input information. Reference numeral 12 denotes a torque sensor for sensing steering torque in a steering system; and 13, a vehicle speed sensor for sensing a vehicle speed. The information obtained in the torque sensor 12 and vehicle speed sensor 13 is supplied to the microcomputer 11. Reference numeral 14 denotes a memory, e.g. EEPROM, which is rewritable its contents and hold the contents even when power supply is turned off.

Reference numeral 15 denotes an ignition switch the state of which is inputted to the microcomputer 11 through an interface 16. Reference numeral 17 denotes a timer circuit for controlling a transistor 18 which serves to control a system power source $V_{SYS}$. The operation of the timer circuit is shown in FIGS. 2A and 2B. FIG. 2A shows the state of the ignition switch. FIG. 2B shows the state of the transistor 18. The timer circuit 17 turns on the transistor 18 immediately after the ignition switch 15 turning on, and also turns off the transistor 18 after lapse of a predetermined time t1 which is set for e.g. about 1 sec from the ignition switch 15 turning off.

Reference numeral 19 denotes a 5V power source circuit for generating a 5V power source on the basis of the power supplied through the transistor 18. The 5V power source Vcc generated by the 5V power source circuit 19 is supplied to the microcomputer 11 and reset circuit 20.

The reset circuit 20 serves to reset the microcomputer 11 by the power-on-reset at the time of starting the controller, or when the power source Vcc is lowered or abnormality occurs in the watchdog signal supplied from the port P6 of the microcomputer 11. Now referring to FIGS. 3A to 3C, the operation of the reset circuit 20 will be explained below.

FIGS. 3A, 3B and 3C show the waveforms of the 5V power source Vcc, reset signal and watchdog signal, respectively.

The reset circuit 20 produces an L level signal immediately after the 5V power source Vcc becomes lower than a predetermined value set for e.g. 4.8 V, and resets the microcomputer 11. Further, when the 5V power source Vcc exceeds the predetermined value, the reset circuit 20 produces an H level signal after a predetermined time t2 set for e.g. 100 msec to release the microcomputer 11 from its reset status.

The reset circuit 20 resets the microcomputer 11 in accordance with the status of the watchdog signal. It is assumed that the watchdog signal is a pulse signal produced always when the microcomputer 11 operates normally and having a frequency set at e.g. 100 Hz. This signal is generated by a program installed in the microcomputer 11.

The abnormality of the watchdog signal is caused due to the facts that the microcomputer 11 runs away owing to electromagnetic noise and that the microcomputer 11 is not supplied with power.

In FIG. 3C, the reset signal is periodically produced after the lapse of a predetermined time t3, e.g. 70 msec from when the watchdog signal is interrupted.

Since the abnormality of the watchdog signal has only to be detected, the timing when its frequency becomes less than 20 Hz may be detected to reset the computer 11.

Figure 4:
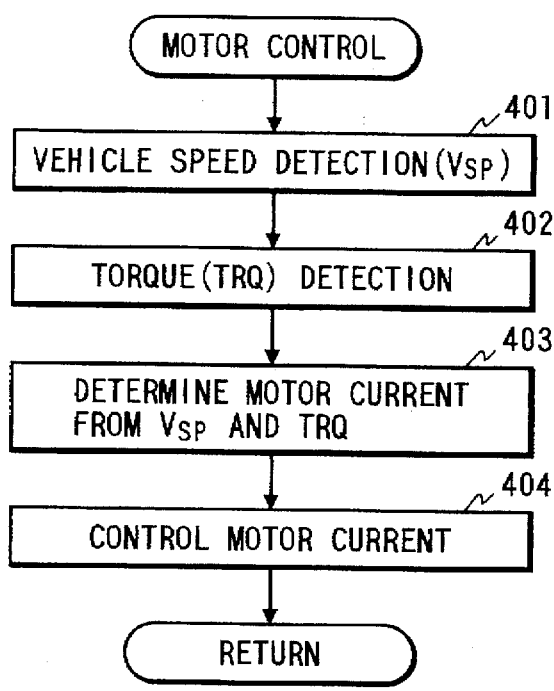
FIG. 4 is a flowchart showing the control of a motor.

An explanation will be given of the control of the motor 2 in a power steering control device. FIG. 4 is a flowchart showing the control for the motor 2.

Figure 5:
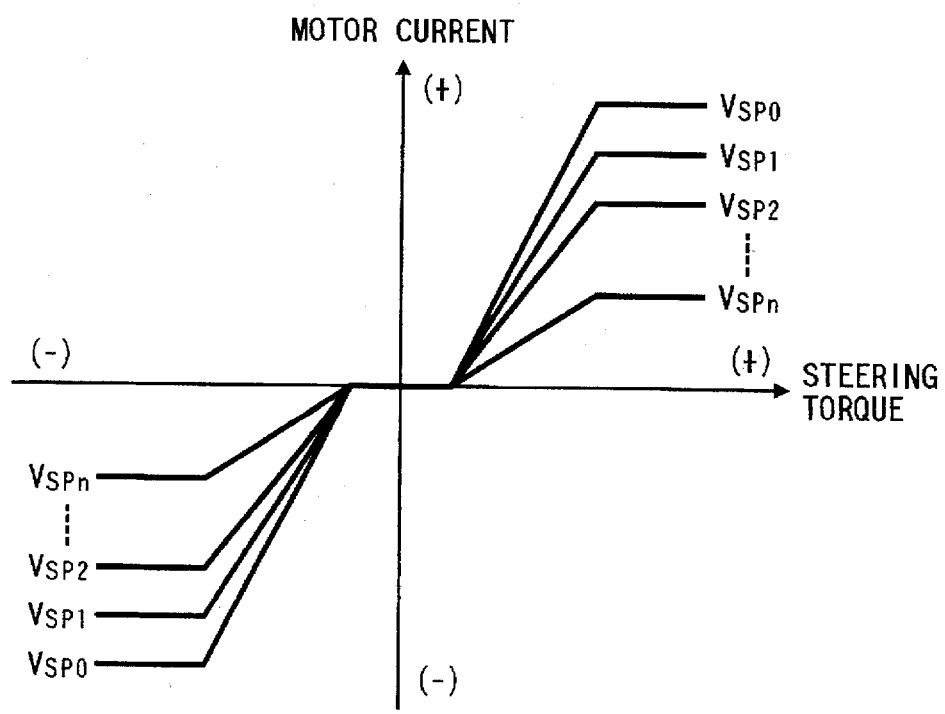
FIG. 5 is a graph showing the characteristic of a motor current.

Now it is assumed that the steering is handled rightwards. In step 401, the present vehicle speed Vsp is taken from a vehicle speed sensor 13. In step 402, torque information TRQ is taken from a torque sensor 12. The torque information TRQ is produced as a signal with a plus polarity (referred to as a plus signal) when the steering is handled rightwards and another signal (referred to as a minus signal) with a minus polarity when the steering is handled leftwards. In step 403, the direction and value $I_{MT}$ of the current supplied to the motor 2 are determined in accordance with the motor current characteristic shown in FIG. 5 on the basis of the vehicle speed information Vsp and torque information TRQ obtained in steps 401 and 402. In FIG. 5, $V_{SP0}$ represents the motor current when the vehicle speed is zero. The motor current varies like $V_{SP1}$ and $V_{SP2}$ as the vehicle speed increases.

Now, since the steering is handled rightwards, the plus current will be supplied to the motor 2. The plus current represents a current flowing from a motor terminal M1 to a motor terminal M2, which induces supplemental force in a right direction. The minus current functions reversely to the minus current. In step 404, the current flowing through the motor 2 is controlled so as to be coincident with the current determined in step 403.

Then, the microcomputer 11 produces a PWM (Pulse Width Modulation) signal from port PWM 1, an L level signal from port PWM 2, an H level signal from port P1 and an L level signal from port 2. These signals are supplied to the drive circuits 4a to 4d to drive the transistors 3a to 3d. Then, the transistor 3a performs the PWM operation, the transistor 3c turns on, and the transistors 3b and 3d turn off. Thus, the current flows from the motor terminal M1 to M2 through the transistors 3a and 3c. This current flows to ground through the shunt resistor 5 to generate a voltage proportional to the current at the one end of the shunt resistor 5. On the basis of the voltage thus generated, the current detection circuit 6 detects the motor current to be supplied to the microcomputer 11. The microcomputer 11 adjusts the duty ratio Of the PWM signal from the port PWM1 so that the detected current is coincident to the current determined in step 403.

Incidentally, the steering is operated leftwards, the microcomputer 11 produces the L level signal from the port PWM 1, the PWM signal from the port PWM 2, the L level signal from the port P1 and the H level signal from the port P2 so that the motor current flows from the motor terminal M2 to M1.

Figure 6:
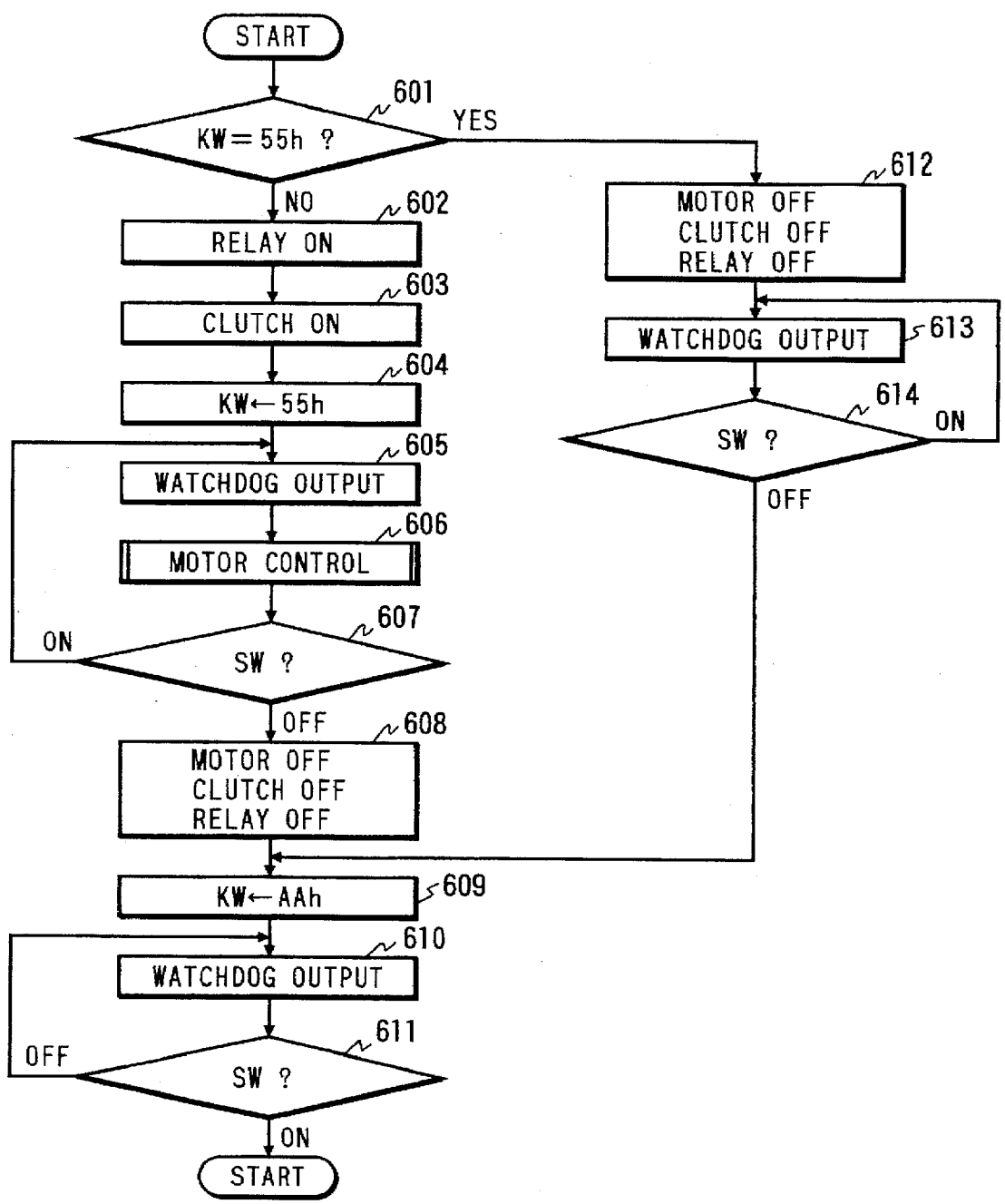
FIG. 6 is a flowchart showing the control according to the first embodiment of the present invention.

FIG. 6 is a flowchart showing the control in the controller apparatus for a vehicle. In step 601, the value of a predetermined address KW in memory 14 immediately after the microcomputer is started is checked. It should be noted that the address KW and the step 601 constitute a status detection means and a status decision means, respectively.

In step 601, it is decided whether or not the value of the address KW is 55h as the first value. If the decision result is N, in step 602, the relay driving circuit 10 is driven to turn on the relay 9. In step 603, the clutch driving circuit 8 is driven to turn on the clutch 7. In step 604, the first value of 55h is written at the address KW. In step 605, a watchdog signal is produced from the port P6. In step 606, the motor control described above is performed. In step 607, it is decided whether or not the ignition switch 15 is "on". While the ignition switch 15 is "on", the processing in each of the steps 605, 606 and 607 is repeated. When the ignition switch 15 is turned off, the processing process proceeds to step 608. In step 608, the current supply to the motor 2 is stopped to turn off the clutch 7 and relay 9. In step 609, the second value of AAh is written at the address KW.

Now, the system power supply $V_{SYS}$ is adapted to turn off after lapse of a predetermined time t1 from the ignition switch turning off. Since the predetermined time t1 is set for the value which is longer than the time when the processing in steps 607 to 609 terminates, the value of AAh is surely written at the address KW.

In step 610, the watchdog signal is produced in the same manner as in step 605, and in step 611, it is decided whether the ignition switch 15 is off or not. Namely, unless the ignition switch 15 is not closed within a predetermined time t1, in step 610 or 611, the system power supply $V_{SYS}$ is lowered so that the control is ended. If it is closed, the processing process is returned to step 601 again, and the control is continued.

When the control normally ends as described above, the second value of AAh has been written and stored at the address KW.

Now it is assumed that ground fault has occurred in the current path to the motor 2 during the control of the motor 2 in the above step 606.

When ground fault occurs, an excessive current flows from the battery 1 to ground so that the voltage of the battery 1 is lowered greatly. For this reason, the 5V power supply circuit 19 cannot maintain Vcc at 5 Volt. Thus, Vcc is lowered to a predetermined value Vth or less. In response to this Vcc signal, the reset circuit 20 resets the microcomputer 11.

Accordingly, the microcomputer 11 is reset during the control in step 606. At this time, the contents of the address KW are the first value of 55h written in step 604. When the microcomputer 11 is started again after the microcomputer 11 has been reset is 55h, the address KW is 55h.

The microcomputer 11 is started again to proceed to step 601. Then, since the address KW has stored the first value of 55h, the microcomputer 11 proceeds to step 612. In step 612, the motor 2, clutch 7 and relay 9 are turned off, the control of the power steering is inhibited. In step 613, the watchdog signal is produced, and in step 614, it is decided whether the ignition switch 15 is turned off or not.

Namely, when the microcomputer 11 is reset during the control of the motor 2, the control for the power steering is inhibited and the turn-off of the ignition switch 15 is awaited. When the ignition switch 15 is turned off, in step 609, the second value of AAh is written at the address KW. The same processing as described above will be performed.

Incidentally, the predetermined time t1 is set for the value which is longer than the processing time in steps 614 and 609.

Thus, at the time of starting of the microcomputer 11, it can be decided that when the address KW has the contents of the second value of AAh, the reset at issue is normal reset (i.e. power-on-reset) due to the turn-on of the ignition switch 11, and when the address KW has the contents of the first value of 55h, the reset at issue is the reset performed during the control.

Incidentally, the reset of the microcomputer in control is not generally performed. Therefore, if the reset occurs during the control, it is abnormal reset due to any abnormality.

Further, in accordance with the first embodiment of the present invention, since the predetermined time t1 is set for the value longer than the time when the processing in step 609 has been ended, the contents of the address KW can be rewritten surely. As a result, inconvenience of erroneous decision due to rewrite mistakes will not occur.

Since the memory 14 is not accessed after the contents of the address KW has been rewritten in step 669, there is no fear that the storage contents of the memory 14 are broken the instant the system power source $V_{SYS}$ is lowered. There is no fear of erroneous decision in step 601.

Where the motor current is detected using the shunt resistor provided between the relay 9 and the transistors 3a, 3b, it is necessary to use a differential amplifier for detecting the voltages at both ends of the shunt resistor to amplify the potential difference between them. Otherwise, it is necessary to use a current detection circuit for detecting the voltages at both ends of the shunt resistor to acquire a current value on the basis of the potential difference therebetween and a level conversion circuit for level-converting the current value signal into a signal relative to ground.

On the other hand, in the first embodiment of the present invention, since the motor current is detected using the shunt resistor 5 provided on the side of ground, it is not required to convert the motor current into a signal level relative to ground. This permits the controller apparatus according to this embodiment to be fabricated at low cost.

Embodiment 2

The second embodiment can decide surely the reset of the microcomputer 11 in control with no error.

In the first embodiment, it was decided whether or not the reset has been performed during the control using the 1 byte data of the address KW. However, after the ignition switch 15 is turned off to complete the control, for some reasons, e.g. electromagnetic noise, the storage contents of the address KW may be accidentally replaced by the first value of 55h.

In order to obviate such an inconvenience, in the second embodiment, the above decision is made using two bytes of addresses KW1 and KW2 so that the possibility of erroneous decision is lowered.

Figure 7:
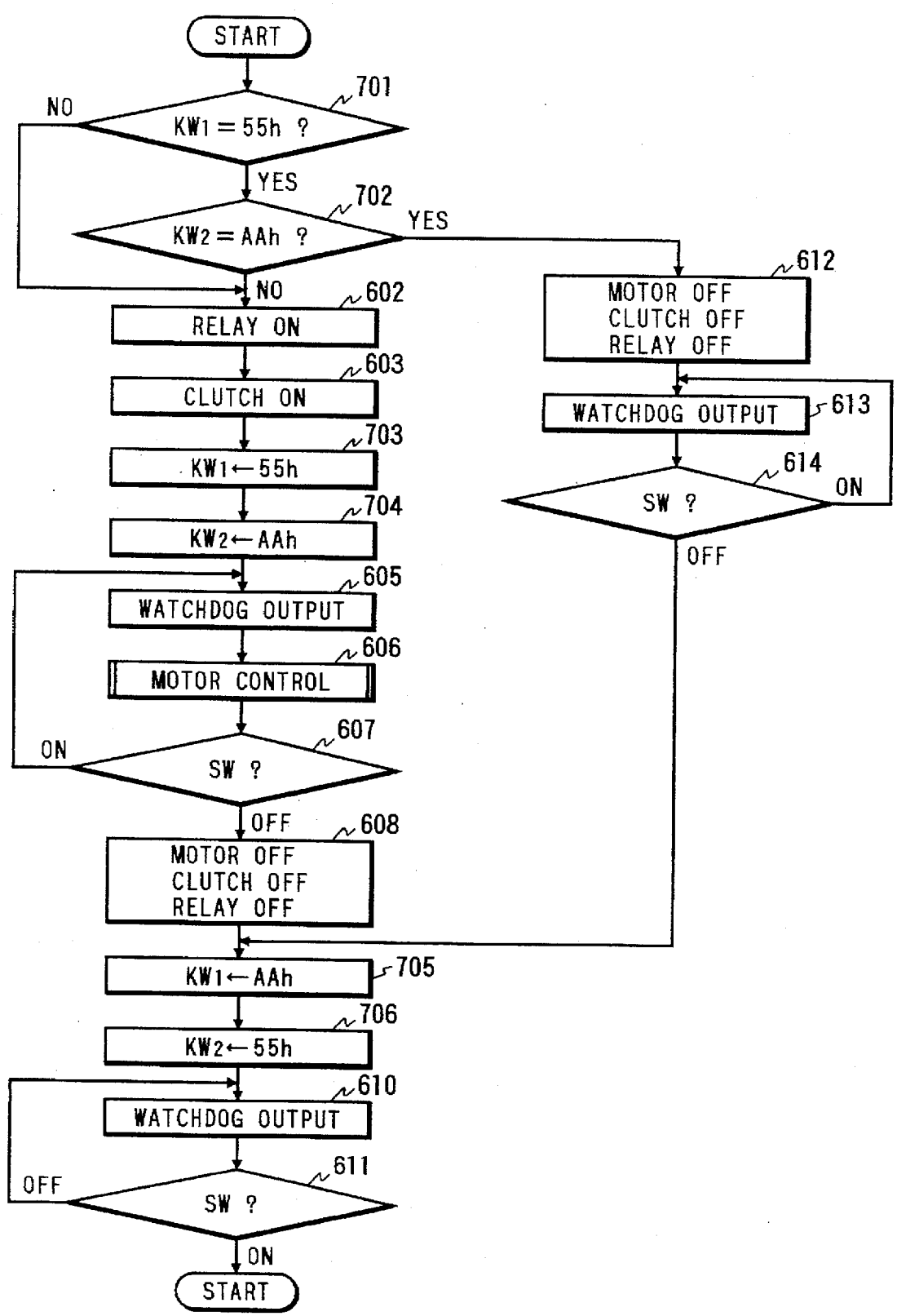
FIG. 7 is a flowchart showing the control according to the second embodiment of the present invention.

FIG. 7 shows the flowchart of the control according to the second embodiment. In FIG. 7, same reference numerals refer to corresponding parts in FIG. 6.

Where the control is normally carried out, the value of 55h is written at the address KW1 in step 703, and the value of AAh is written at the address KW2 in step 704. The addresses KW1 and KW2 constitute status detecting means, respectively.

Thereafter, the control of the motor 2 is performed. At the time of completion of the control of power steering, the storage contents of the address KW1 are changed into AAh in step 705, and the contents of the address KW2 is changed into 55h in step 706. Incidentally, it should be noted that AAh is the second value at the address KW1 and 55h is the second value at the address KW2.

Thus, where the control is normally completed, the second values have been stored at the addresses KW1 and KW2, respectively, and where the computer is reset during the control, the first values have been stored at the addresses KW1 and KW2, respectively.

In steps 701 and 702, it is decided that the computer has been reset during the control only when the first values have been stored at the addresses KW1 and KW2, respectively. Then, the subsequent processing in step 612 will be continued.

Therefore, in the second embodiment, if the erroneous decision occurs, the values at the addresses KW1 and KW2 must be changed into the corresponding first values. But, such a thing will hardly occur actually.

Accordingly, it can be surely decided with no error that the computer has been reset in control.

Embodiment 3

In the embodiments described above, when it is decided that the microcomputer has been reset in control, the microcomputer does not perform the control of power steering. However, the reset during the control should not be necessarily due to critical accidents such as abnormality of the current path to the motor 2. The reset during the control includes accidental reset due to electromagnetic noise and single reset due to runaway of the microcomputer 11.

Therefore, not performing the control of the power steering because the microcomputer 11 has been reset means unnecessary protection, thus reducing drivability.

In the third embodiment, the ground fault in the current path to the motor 2 and that due to the other cause are discriminated from each other noting that in the former, the microcomputer 11 in control is successively reset each when the it is started whereas in the latter, the microcomputer 11 is rarely successively reset.

Figure 8:
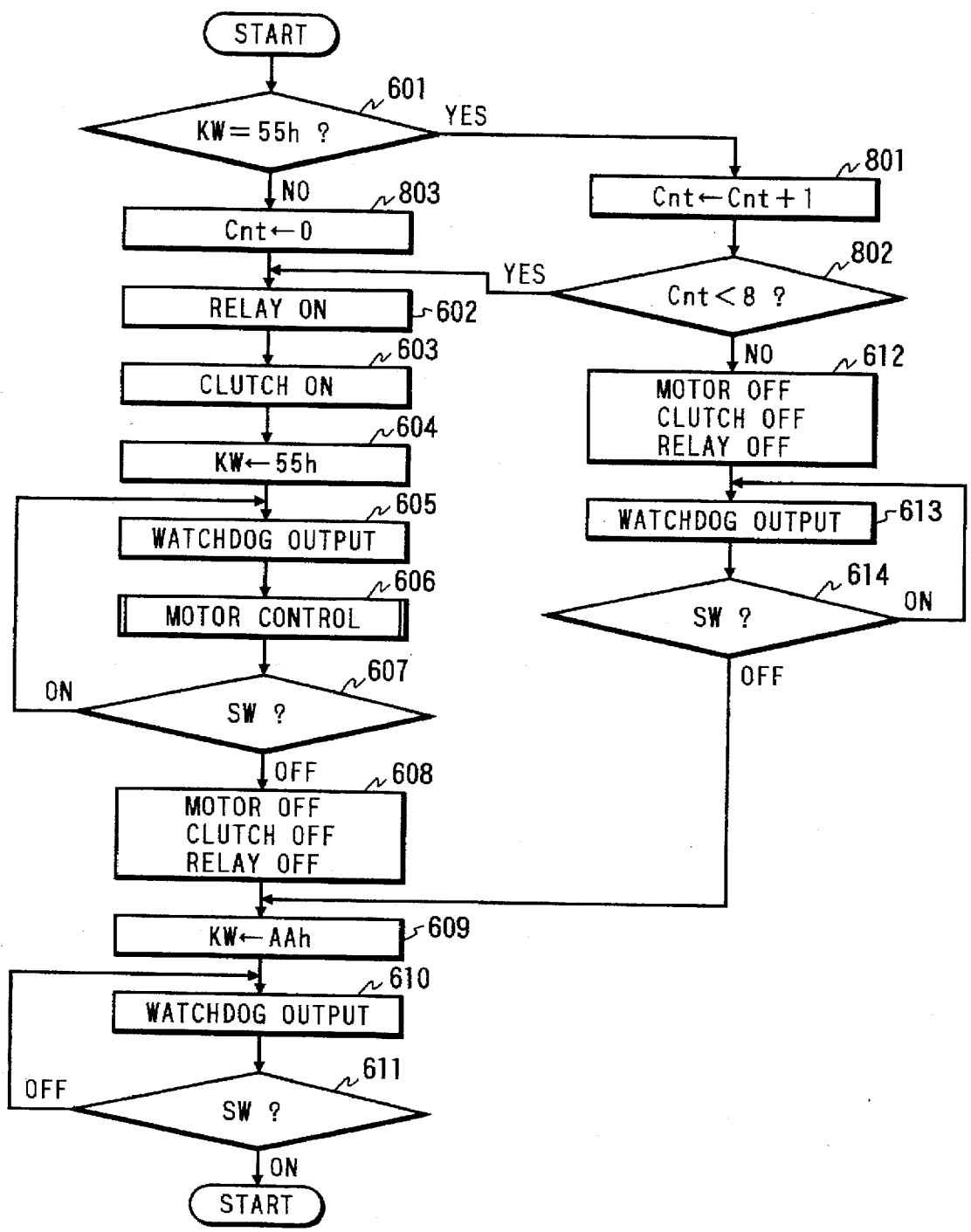
FIG. 8 is a flowchart showing the control according to the third embodiment of the present invention.

FIG. 8 shows the flowchart of the control according to the third embodiment. In FIG. 8, like reference numerals refer to like or corresponding parts in FIG. 6.

An explanation will be given of the case where the microcomputer 11 in control has been reset once owing to an accidental or single cause.

At the time of re-starting of the microcomputer 11, since the first value of 55h has been stored at the address KW, in step 601, the decision of Y is made. The processing process proceeds to step 801. In the third embodiment, there is provided a counter cnt which is a counting means. In step 801, the value of the counter cnt is incremented by 1. In step 802, it is decided whether or not the value of the counter cnt is less than eight times which is a predetermined number of times. Now, since the value of the counter cnt is 1, the decision of Y is made. The microcomputer 11 advances to step 602, thereby performing the subsequent processing in the manner as described above. The storage contents at the address KW is rewritten into the second value of AAh, thus completing the processing.

When the microcomputer 11 is started again, in step 601, the decision of N is now made. Thus, the value of the counter cnt is cleared to zero, which is succeeded by the subsequent processing.

Accordingly, even when the microcomputer 11 is reset in control, if it is accidental or single, the computer does not stop but continue the control of power steering.

An explanation will be given of the case where the ground fault occurs in a current path to the motor 2.

In this case, the microcomputer 11 is reset each when the motor control in step 606 is performed as long as the repair is not made.

Where the number of reset is seven times or less, the microcomputer 11 does not stop but continue the control of power steering. However, where the reset occurs eight times successively, in step 802, the decision of N is made. The microcomputer 11 performs the processing in step 612 et seq. to stop the control of the power steering.

In accordance with the third embodiment, in the case of reset during the control due to electromagnetic noise, the control of power steering is continued to improve drivability. In the case of a critical accident such as ground fault, the control of power steering can be stopped to protect the controller apparatus.

Embodiment 4

The control apparatus according to the fourth embodiment of the present invention is provided with an initial abnormality detecting means for detecting the presence or absence of abnormality in the current path to the motor 2 before the start of control. In the fourth embodiment, in the case of the abnormal reset during the control, the detection of abnormality is not carried out.

Figure 9:
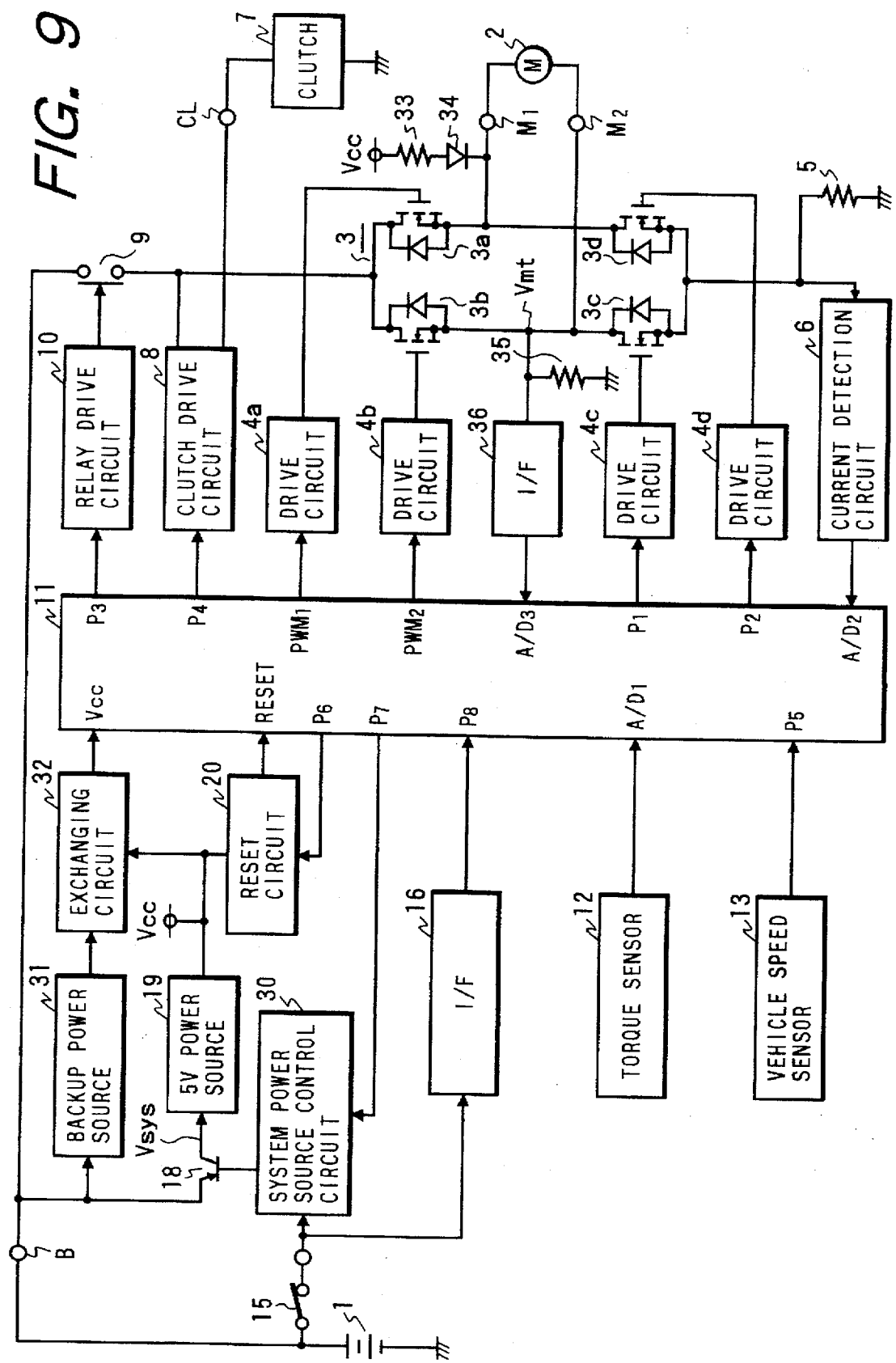
FIG. 9 is a block diagram showing the circuit configuration of the control apparatus according to the fourth to seventh embodiments of the present invention.

FIG. 9 is a block diagram showing the circuit arrangement of the controller apparatus for a vehicle according to the fourth to seventh embodiments of the present invention. In FIG. 9, same reference numerals refer to corresponding parts in FIG. 1.

In FIG. 9, reference numeral 30 denotes a system power supply control circuit which is constituted to turn on the transistor 18 when the ignition switch 15 is "on" or the port P7 of the microcomputer 11 produces an H level signal. Reference numeral 31 denotes a backup power supply which supplies power to the microcomputer 11 even when the ignition switch 15 is "off" to hold the contents of an RAM which is storage means within the microcomputer 11. Reference numeral 32 is a switching circuit which supplies power from the backup power supply 31 when the 5V power source circuit 19 is "off" and supplies power from the 5V power source circuit 19 to the microcomputer 11 when the 5V power supply circuit 19 is "on". In FIG. 9, the memory 14 which is an EEPROM is omitted.

Further, in FIG. 9, reference numeral 33 denotes a resistor for supplying power from the 5V power source circuit 19 to the motor terminal M1. Reference numeral 34 denotes a diode serving as a unidirectional current passing element which is arranged between the one end of the resistor 33 and the motor terminal M1 and prevents the current from reversely flowing into the 5V power supply circuit when the potential at the motor terminal M1 is enhanced, e.g. the transistor 3a turns on. Reference numeral 35 is a resistor whose one terminal is connected to the motor terminal M2 and whose other terminal is connected to ground. The current supplied from the 5V power supply circuit flows to ground through the resistor 33, diode 34, motor terminal M1, motor 2, motor terminal M2 and resistor 35. This current has such a value that torque in the motor 2 is not generated. When all the transistors 3a to 3d are "off", a predetermined voltage, e.g. 2.5 V is generated. Reference numeral 36 denotes an interface (I/F) Which detects the voltage at the motor terminal M2 and applies it to the microcomputer 11.

Figure 10:
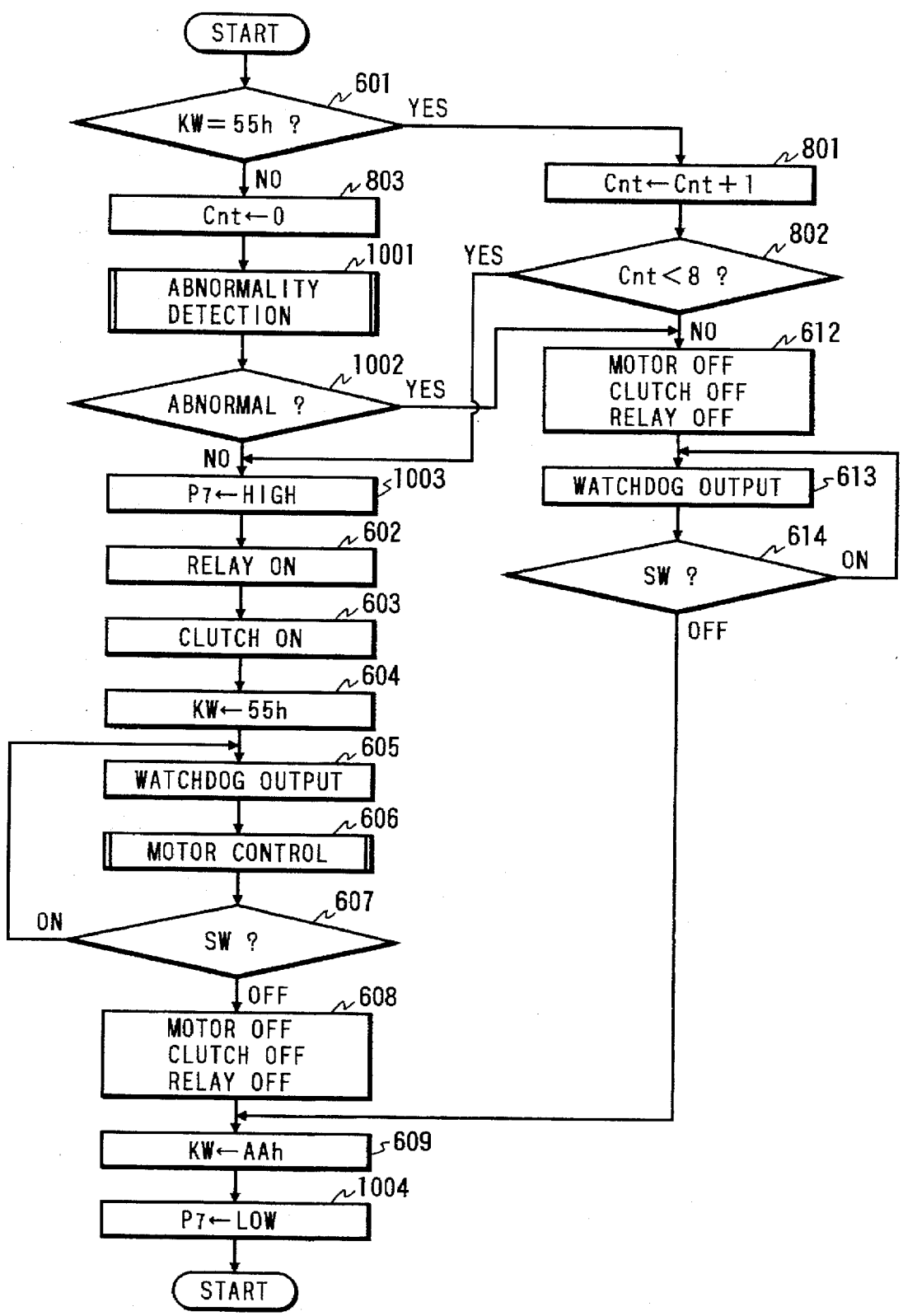
FIG. 10 is a flowchart showing the control according to the fourth embodiment of the present invention.

FIG. 10 is a flowchart of the control in the fourth embodiment. In FIG. 10, like reference numerals refer to like or corresponding processing in previous figures.

In step 601, immediately after the microcomputer 11 is started, the address KW of a predetermined RAM in the microcomputer 11 is checked. If the value of the address KW is not a predetermined value of 55h, the processing process proceeds to step 803 where the counter cnt is cleared to zero, and proceeds to step 1001.

Figure 11:
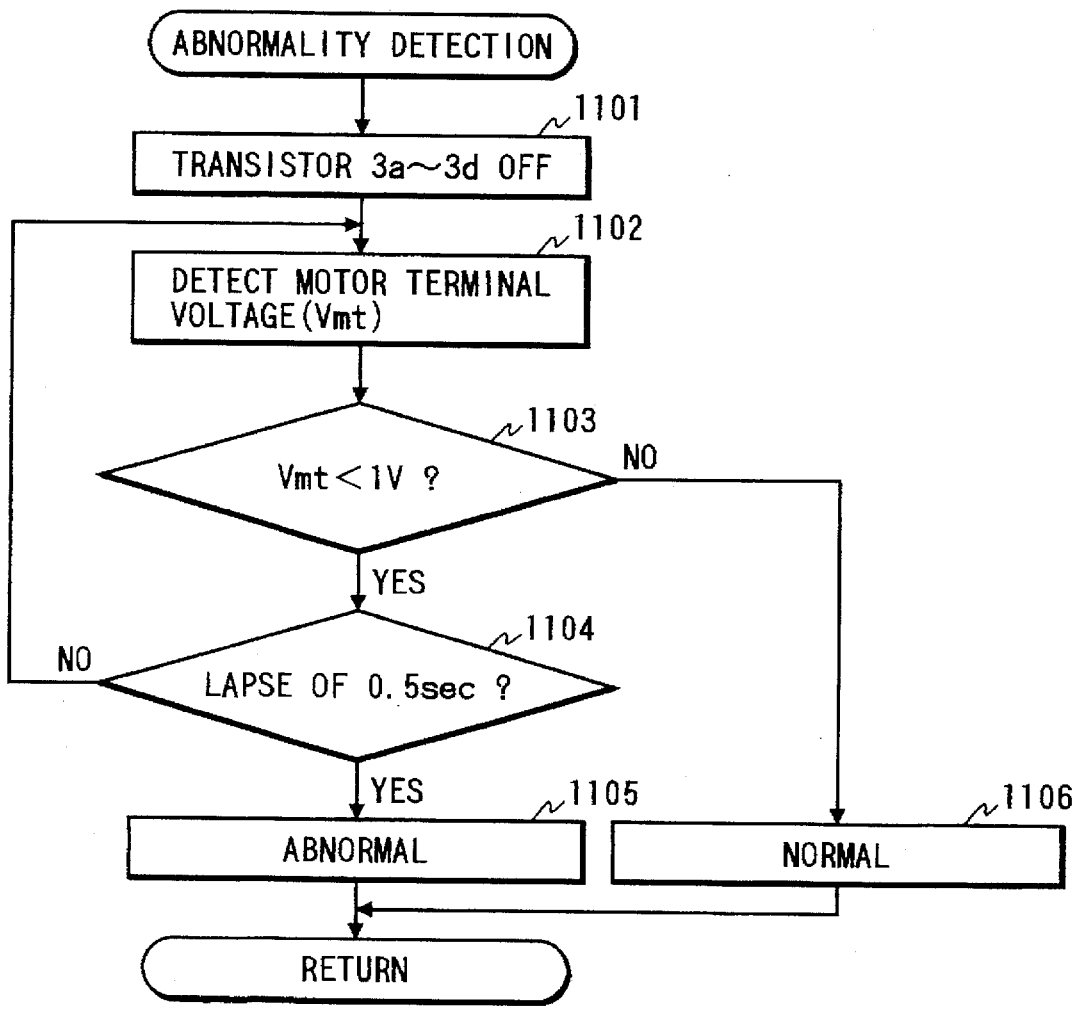
FIG. 11 is a flowchart showing abnormality control processing.

The step 1001 serves as an initial abnormality detection means in which the initial abnormality of the control apparatus is detected. The detailed processing of detection of abnormality in step 1001 is shown in FIG. 11.

The detection of initial abnormality is carried out on the basis of the voltage signal at the motor terminal M2 obtained from the interface 36. First, all the transistors 3a to 3d have been turned off previously. Therefore, if short-circuiting or ground fault has not occurred in the current path to the motor 2, the voltage at the motor terminal M2 is 2.5 V. On the other hand, if the above accident has occurred, the voltage is generally different from 2.5 V. In step 1001, on the basis of this technical concept, abnormality in the current path to the motor 2 is detected.

In step 1101, all the transistors 3a to 3d are turned off. In step 1102, the voltage Vmt at the motor terminal M2 is inputted from an A/D input port A/D 3. In steps 1103 and 1104, the decision of abnormality is made when the state where the voltage Vmt is 1 V or less continues for 0.5 sec.

Namely, when there is a ground fault in the current path to the motor 2, the voltage Vmt becomes about 0 volt so that the ground fault can be detected by the above processing.

The short-circuiting of the transistors 3a to 3d can be detected by detecting the fact that the state where the voltage Vmt is equal to or larger than a predetermined value, or not within a predetermined voltage range continues for a predetermined time.

In steps 1105 and 1106, on the basis of the decision results in steps 1103 and 1104, it is decided whether or not there is abnormality in the current path to the motor 2, which will be succeeded by step 1002.

In step 1002, if abnormality is not detected in step 1001, the processing process proceeds to step 1003. In step 1003, an H level signal is produced from the port P7 of the microcomputer 11.

Thereafter, the processing process proceeds to the processing in step 602 et seq. so as to control the power steering.

After driving of a vehicle is ended to turn off the ignition switch 15, the contents of the address KW are changed into the other value AAh than a predetermined value. In step 1004, the signal at the port P7 is changed from its H level to its L level. Then, since the ignition switch 15 is "off" and the signal at the port P7 is the L level, the system power source control circuit 30 turns off the transistor 18. Thus, the 5 V power source circuit 19 turns off. The exchanging circuit 32 exchanges the power supply to the microcomputer 11 from the 5 V power supply circuit 19 to the backup power source 31. Thus, the microcomputer 11 completes the processing process. Thereafter, the backup power source 31 continues to supply power to the microcomputer 11 so as to hold the value at the address KW of the RAM.

On the other hand, when accidental or single reset occurs during the control of the motor 2, in step 601, the decision of Y is made, Which is succeeded by steps 801 and 802.

Incidentally, it should be noted that the step 601 also serves as means for deciding whether or not the contents of the address KW of the RAM is correct. Specifically, the RAM, when it is not supplied with power, will loose the storage contents. The fact that a predetermined value of 55h is stored at the address of the RAM means that power has been continuously supplied to the microcomputer 11. This means that the value of the address KW of the RAM is correct.

In step 601, therefore, it is decided whether or not the address KW of the RAM is correct and whether or not the contents of the address KW is 55h.

In steps 801 and 802, if the reset does not occur eight times successively, the control of the motor 2 is continued. Then, it should be noted that the processing of detecting abnormality in step 1001 is skipped.

When the ground fault occurs in the current path to the motor 2, the reset during the control is carried out successively eight times. The processing process proceeds to step 612 et seq.

In short, in accordance with the fourth embodiment, the abnormality detection processing in step 1001 is performed only when the microcomputer 11 is started again after the control is ended normally. When the microcomputer 11 is started again after the reset occurs during the control, the processing of abnormality detection will be skipped.

Thus, the presence or absence of abnormality in the current path to the motor 2 can be detected before the control of the motor 2 to protect the controller apparatus. The operation that in order to detect the abnormality in the current path to the motor 2, all the transistors 3a to 3d are turned off to lose the assistance force of steering temporarily will not be performed during the driving of a vehicle.

Further, when the ignition switch 15 is turned on, the detection of abnormality in the current path to the motor 2 is first performed. The ground fault or short-circuit occurring when the control is not performed with the ignition switch 15 being off can be also detected before the control of the motor 2 is performed, thereby relaxing the burden on the controller apparatus.

In the processing of abnormality detection in step 1001, although only the presence or absence of abnormality in the current path to the motor 2 was detected, the presence or absence of other abnormalities may be detected.

For example, in a system wherein a plurality of loads are connected to detect the ground fault for each load, abnormality detection permits the load relative to ground fault to be identified.

Embodiment 5

In the fourth embodiment of the present invention, the abnormality detection processing was skipped when the microcomputer 11 was reset in control. However, the problem that assistance force is abruptly lost occurs while the vehicle is running and the steering is being operated. Therefore, when the reset is made during the control, it is desired that the abnormality detection is carried out except during the above operation state.

In the fifth embodiment, on the basis of the above technical idea, even when the reset occurs during the control, when it is not during both the vehicle running and power steering, the abnormality detection is carried out.

Figure 12:
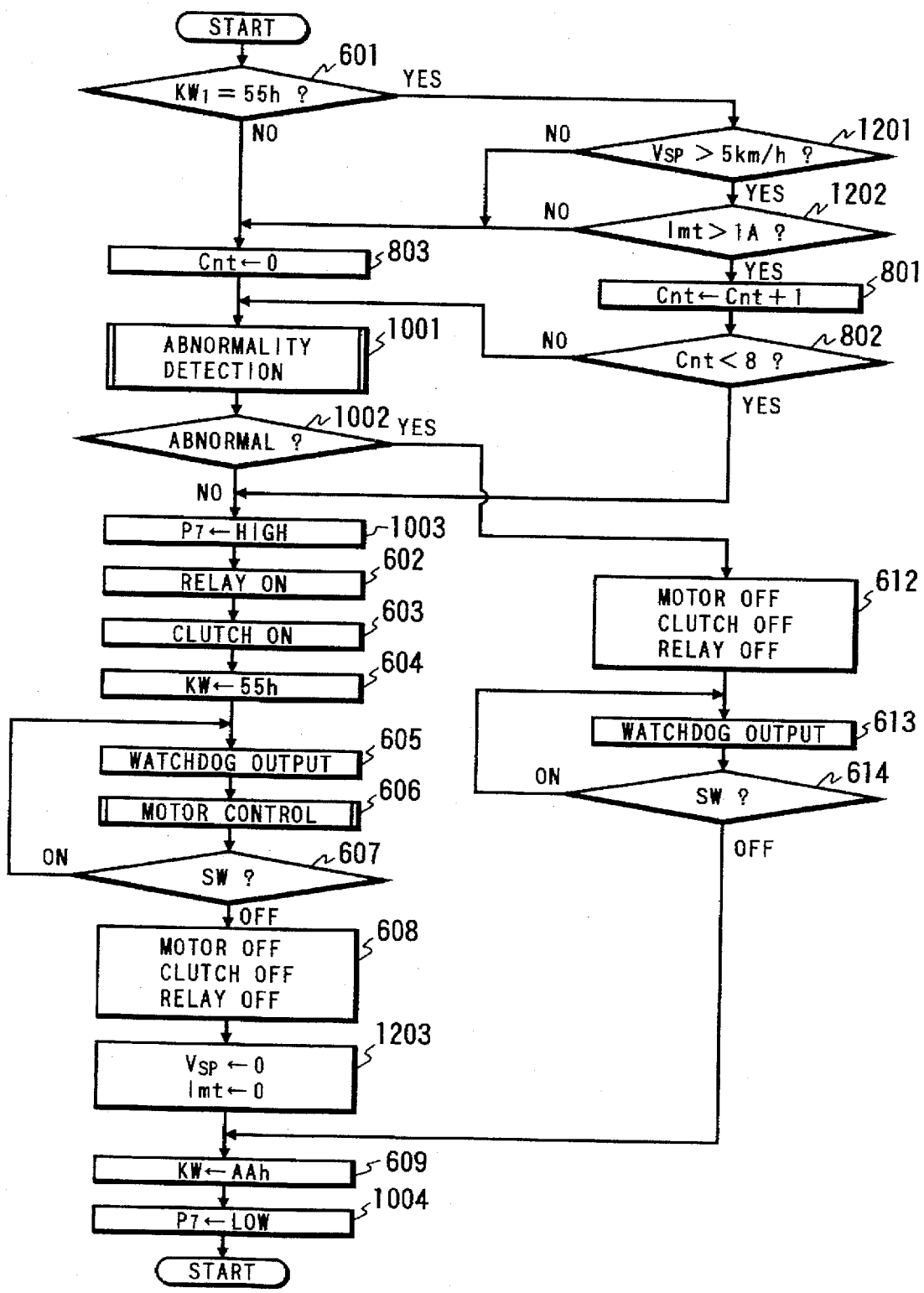
FIG. 12 is a flowchart showing the control according to the fifth embodiment of the present invention.

FIG. 12 shows the flowchart of the control according to the fifth embodiment. In FIG. 12, like reference numerals refer to like or corresponding processing in the previous figures.

In step 601, it is decided whether or not the contents of the address KW is correct and whether or not they are 55h. When the address KW is not a predetermined value of 55h, the processing process proceeds to step 803, which is succeeded by the processing described above.

The above processing process will proceed. In step 606, the vehicle speed Vsp and the motor current Imt have been stored and updated at the predetermined addresses. Now, the vehicle speed Vsp is a value taken from the vehicle speed sensor 13 in step 401, and the motor current Imt is a value obtained in step 403 on the basis of the characteristic shown in FIG. 5.

Now it is supposed that the microcomputer 11 has been reset while the motor 2 is controlled in step 606.

Now it is assumed that a predetermined running state, i.e. the state where a vehicle is running and the power steering is operated is where the vehicle speed is larger than 5 Km/h and the motor current Imt is larger than 1 A. Then, in both steps 1201 and 1202, the decision of Y is made, which is succeeded by step 801 et seq. If the reset during the control is less than 8 times, the abnormality detection processing in step 1001 is skipped to continue the motor control, and if it is 8 times or more, the abnormality detection is carried out in step 1001.

Incidentally, it should be noted that steps 1201 and 1202 constitute a running state detecting means.

In the case except a predetermined running state, in either step 1201 or 1202, the decision of N is made, which is succeeded by steps 803 and 1001.

In the case except the predetermined running state, even when it is decided that the reset at issue is the one during the control, the presence or absence of abnormality in the current path to the motor 2 is detected at the re-starting of the microcomputer 11. Namely, only both during the vehicle running and the steering, the abnormality in the current path to the motor 2 is not detected even when the reset occurs during the control, thereby assuring safety. When the reset does not occur during the control, the ignition switch 15 is turned off. Thereafter, in step 1203, the storage contents of the vehicle speed Vsp and motor current Imt are rewritten into zero.

In accordance with the fifth embodiment, therefore, in the predetermined running state, the presence or absence of abnormality in the current path to the motor is not carried out in order to obviate danger, and in the running state except the predetermined running state, the presence or absence of abnormality is detected even when the reset occurs during the control. This contributes to improve safety of the vehicle and protect the controller apparatus.

Embodiment 6

In the previous embodiments, it was decided whether the reset at issue is the one during the control in accordance with whether or not the contents stored in the state detection means are the predetermined value. Therefore, replacement of the storage contents of the state detection means by another value by electromagnetic noise makes it impossible to carry out the intended operation.

For example, where the ignition switch 15 is turned on to control the power steering, it is desired that the abnormality detection processing is first performed and thereafter the motor control is executed. But, as the case may be, the storage contents of the state detection means are accidentally replaced by a predetermined value owing to electromagnetic noise. For this reason, the processing process may skip the abnormality detection and proceeds to the motor control.

In accordance with the sixth embodiment of the present invention, in order to obviate such an inconvenience, it can be surely decided whether or not the contents stored in the state detection means are correct thereby to perform the intended control.

Figure 13:
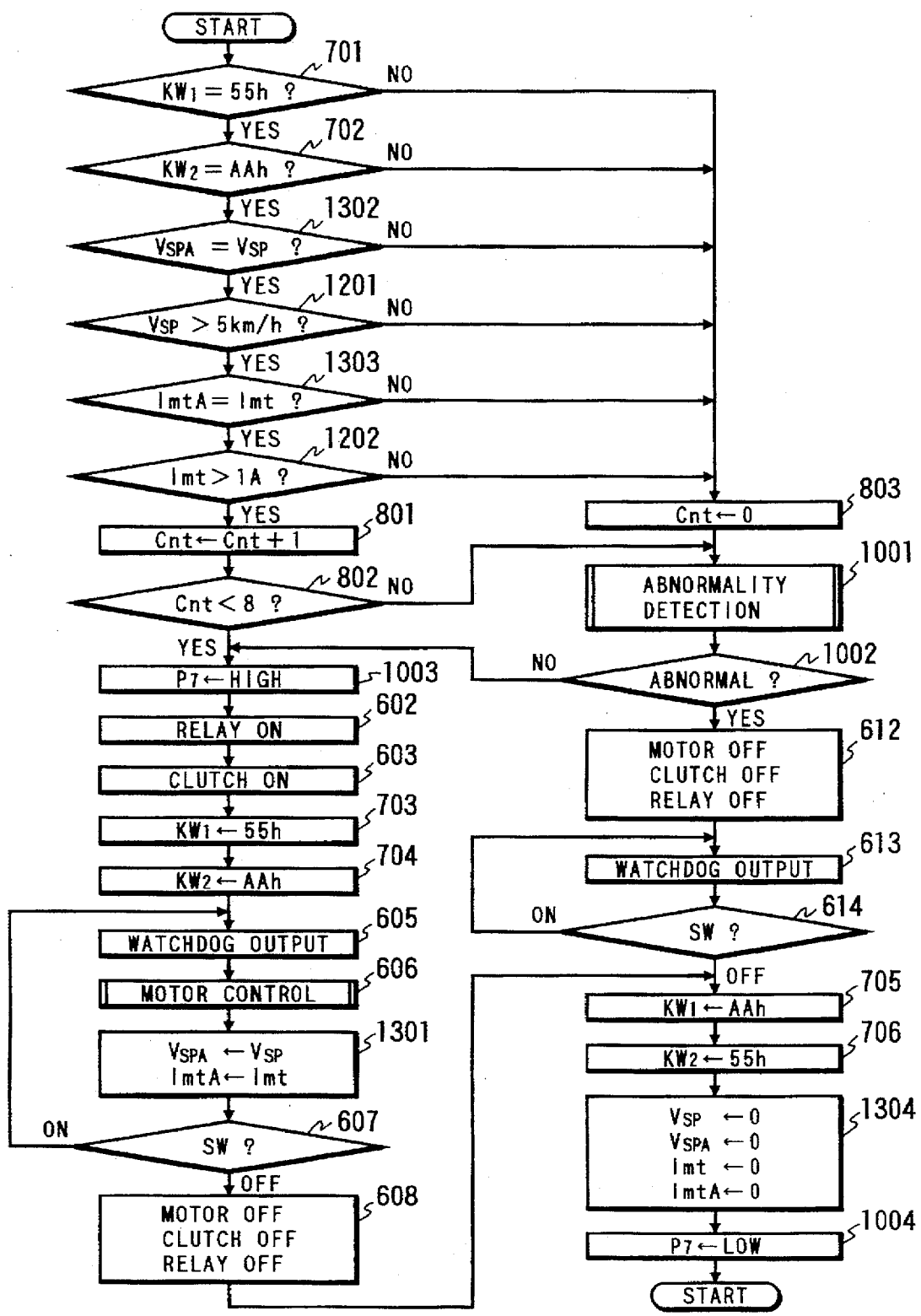
FIG. 13 is a flowchart showing the control according to the sixth embodiment of the present invention.

FIG. 13 shows the control according to the sixth embodiment in flowchart. In FIG. 13, like reference numerals refer to like or corresponding parts in the previous figures.

When the microcomputer 11 is started, the processing process pass steps 701 and 702. In steps 701 and 702, which have been explained with reference to the second embodiment, two-byte information is used to lower the possibility of erroneous decision.

In steps 701 and 702, when it is decided that the address KW1 does not have the first value or the address KW2 does not have the first value, the processing process proceeds to step 803, which is succeeded by the processing described above.

The processing process proceeds to step 1301. In step 1301, the vehicle speed detected in step 401, which was previously explained, is stored at the address Vsp and also copied at the address Vspa. The value of the motor current obtained in step 403, which was previously explained, is stored in the address Imt and also copied on an address Imta. The storage contents of the addresses Vspa and Imta are rewritten whenever the contents of the addresses Vsp and Imt are updated.

It should be noted that the addresses Vsp, Vspa, Imt and Imta are storage means for storing control values.

Now it is assumed that the reset occurs during the control of the motor 2. Then, the first values have been stored at the addresses KW1 and KW2, the vehicle speed immediately before the reset has been stored at the address Vsp, the motor current has been stored at the address Imt, and the copied values on the addresses Vsp and Imt have been stored on the addresses Vspa and Imta.

Now, the microcomputer 11 is started again. If the running state where the microcomputer 11 has been reset is a predetermined running state, as long as the reset does not occur successively eight times or more, abnormality detection in the current path to the motor 2 is not performed.

In the sixth embodiment, however, as long as all the storage contents on the above six addresses are not correct, the abnormality detection is carried out.

This is based on the following technical idea. If any one of the storage contents at the addresses is wrong, that at another address may be also wrong. If the control is continued on the basis of the information on the wrong address, the processing process will proceed to the motor control without performing the abnormality detection. In such a case, if the worst comes to worst, the controller apparatus may be broken.

After the re-starting, therefore, in steps 701 and 702, the values at the addresses KW1 and KW2 are confirmed; in step 1302, the values at the addresses Vsp and Vspa are confirmed; and in step 1303, the values on the addresses Imt and Imta are confirmed. If these conditions are not entirely satisfied, the processing process proceeds to step 803. It should be noted that steps 1302 and 1303 constitute storage decision means.

Steps 1201 and 1202, which have been explained in the previous embodiment, intend to advance the processing process to the abnormality detection processing in the case except the predetermined running state.

When the reset does not occur during the control of the motor 2 and the ignition switch 15 is turned off to terminate the processing process normally, each processing process described above is successively performed. In steps 1304, all the values at the addresses Vsp, Vspa, Imt and Imta are rewritten into an initial value of zero. In step 1004, the power is switched off to terminate the control.

In accordance with the sixth embodiment of the present invention, therefore, since it is decided that the reset has occurred during the control only when it is decided that all the storage contents at the six addresses are correct, the possibility of erroneous decision can be greatly lowered.

Since there is bare possibility of erroneous decision, the intended control can be surely performed.

Embodiment 7

In the power steering control apparatus, in the case of the initial control after the battery 1 is connected, or when the storage contents of RAM are lost owing to reduction in the power supply voltage, it is desired from the viewpoint of apparatus protection to make the control after the presence or absence of abnormality in the current path to the motor 2. Where such failure as does not permit the control of power steering occurs, it is desired to stop the control of power steering and inhibit the subsequent control of power steering.

The seventh embodiment has been completed on the basis of the above technical idea.

Figure 14:
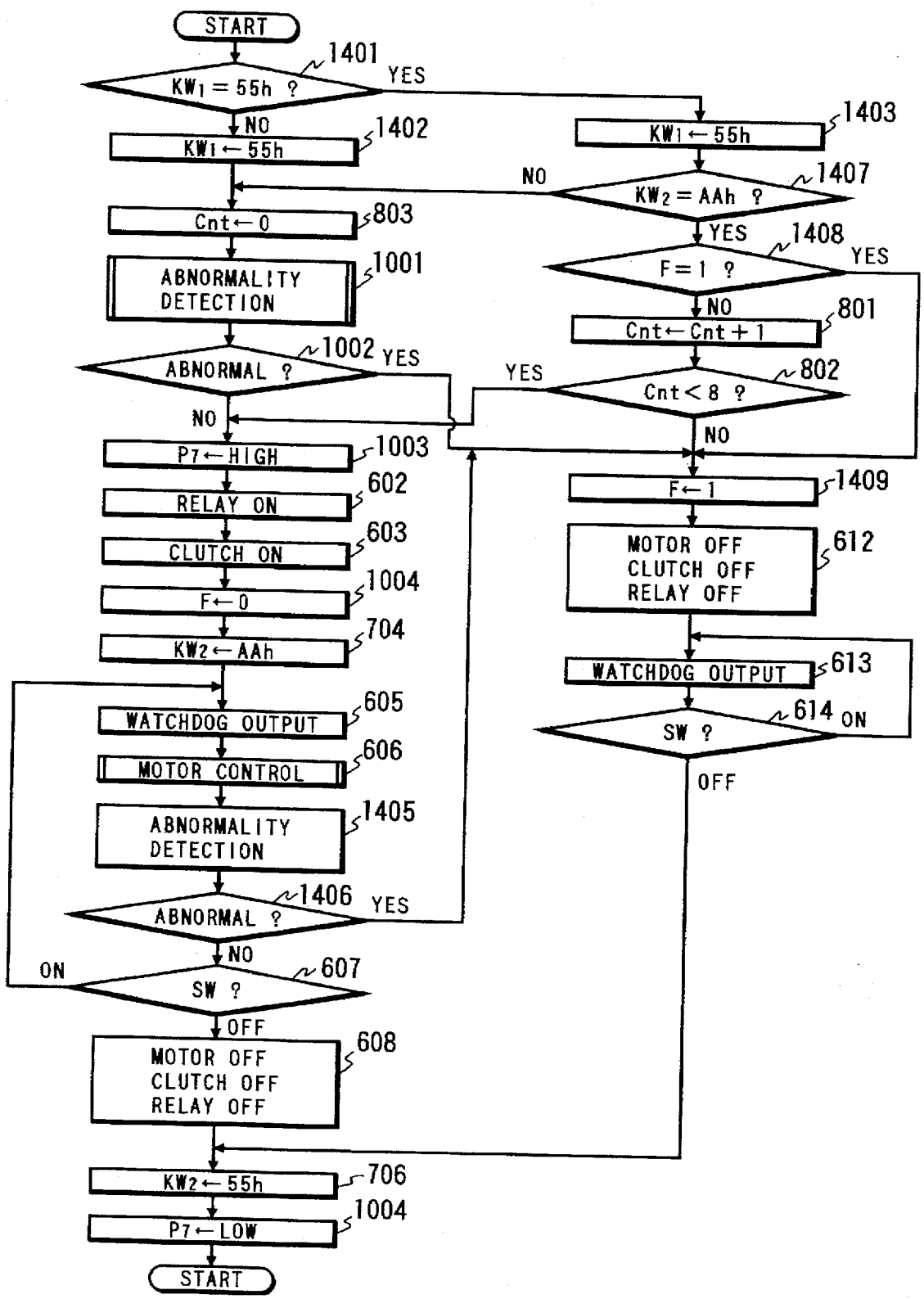
FIG. 14 is a flowchart showing the control according to the seventh embodiment of the present invention.

FIG. 14 shows the control according to the seventh embodiment in flowchart. In FIG. 14, like reference numerals refer to like or corresponding processing in the previous flowcharts.

In step 1401, the power steering control apparatus decides the initial control after the battery 1 is connected or the case when the storage contents of the RAM have been lost owing to reduction in the power supply voltage. Specifically, at the address KW1, in steps 1402 and 1403, the value of 55h is written when the control has been performed even once. This value will not be altered. For this reason, where the value of 55h is not written on the address KW1, it can be decided that the case at issue is either one of the cases where the control has not been performed even once and where although the control has been performed to write 55h at the address KW1, the storage contents have been lost owing to reduction in the power supply voltage.

Therefore, when it is decided that 55h has not been stored at the address KW1 in step 1401, in step 1402, the value of 55h is written at the address KW1. Passing step 803, in step 1001, the presence or absence of abnormality in the current path to the motor 2 is detected.

When there is no abnormality in the current path to the motor 2, in step 1002, the decision of N is made. Passing steps 1003, 602 and 603, the processing process proceeds to step 1404. In step 1404, flag F is cleared to zero. In step 704, the first value AAh is written at the address KW2 which serves as a state detection means.

Thereafter, the processing process proceeds to step 1405 through steps 605 and 606. Step 1405 constitutes a failure decision means which decides whether or not such failure as does not permit the control of power steering has occurred. Namely, in step 1405, failure of the torque sensor 12 and vehicle sensor 13 are detected. Step 1406 serves as inhibiting means which inhibits the control of power steering immediately when the decision of failure has been made in step 1405. In step 1406, when the decision of failure has not been made, the control of power steering is continued and when it has been made, the processing process proceeds to step 1409. In step 1409, "1" is written and stored in flag F. The flag F constitutes as a decision result storage means.

Thereafter, in step 612, the control of power steering is stopped. Each processing described above is successively performed to terminate the processing process.

Then, even when the microcomputer 11 is started again, the control of power steering will not be resumed as long as the failure portion is not repaired.

Now it is assumed that the microcomputer 11 is started again with the failure portion being not repaired. Since 55h written in step 1402 has been stored at the address KW1, in step 1401, the decision of Y is made, and in step 1403, 55h is written at the address KW1 again. The processing process proceeds to step 1407 which serves as a state decision means. In step 1407, it is decided whether or not the computer 11 has been reset in control. When it is decided that the reset has not performed during the control, the processing process proceeds to step 803. When the reset has been performed during the control, the first value AAh written in step 704 has been stored at the address KW2 so that the decision of Y is made. In step 1408, the storage contents of the flag F are decided. When the storage contents of the flag F are zero, such failure as does not permit the control of power steering has not occurred so that the decision of N is made to continue the control. But, since the storage contents of the flag F have been rewritten into 1, the decision of Y is made. In step 1409 et seq., each processing described above is successively carried out. Thus, the control of power steering is inhibited to terminate the processing in the microcomputer 11.

In accordance with the seventh embodiment of the present invention, in the case of the initial control after the battery 1 is connected or when the storage contents of the RAM have been lost owing to reduction in the power supply voltage, the presence or absence of abnormality in the current path to the motor 2 is detected and thereafter the control is carried out. This permits the controller apparatus to be easily protected.

When such failure as does not permit the control of power steering occurs, the control of power steering is immediately stopped. Thereafter, the control of power steering is not performed so as to omit any redundant control.

Embodiment 8

In the previous embodiments, whether or not the microcomputer 11 has been reset in control was decided using memory. On the other hand, in the eighth embodiment, the reset of the microcomputer 11 in control can be surely detected without using the memory.

Figure 15:
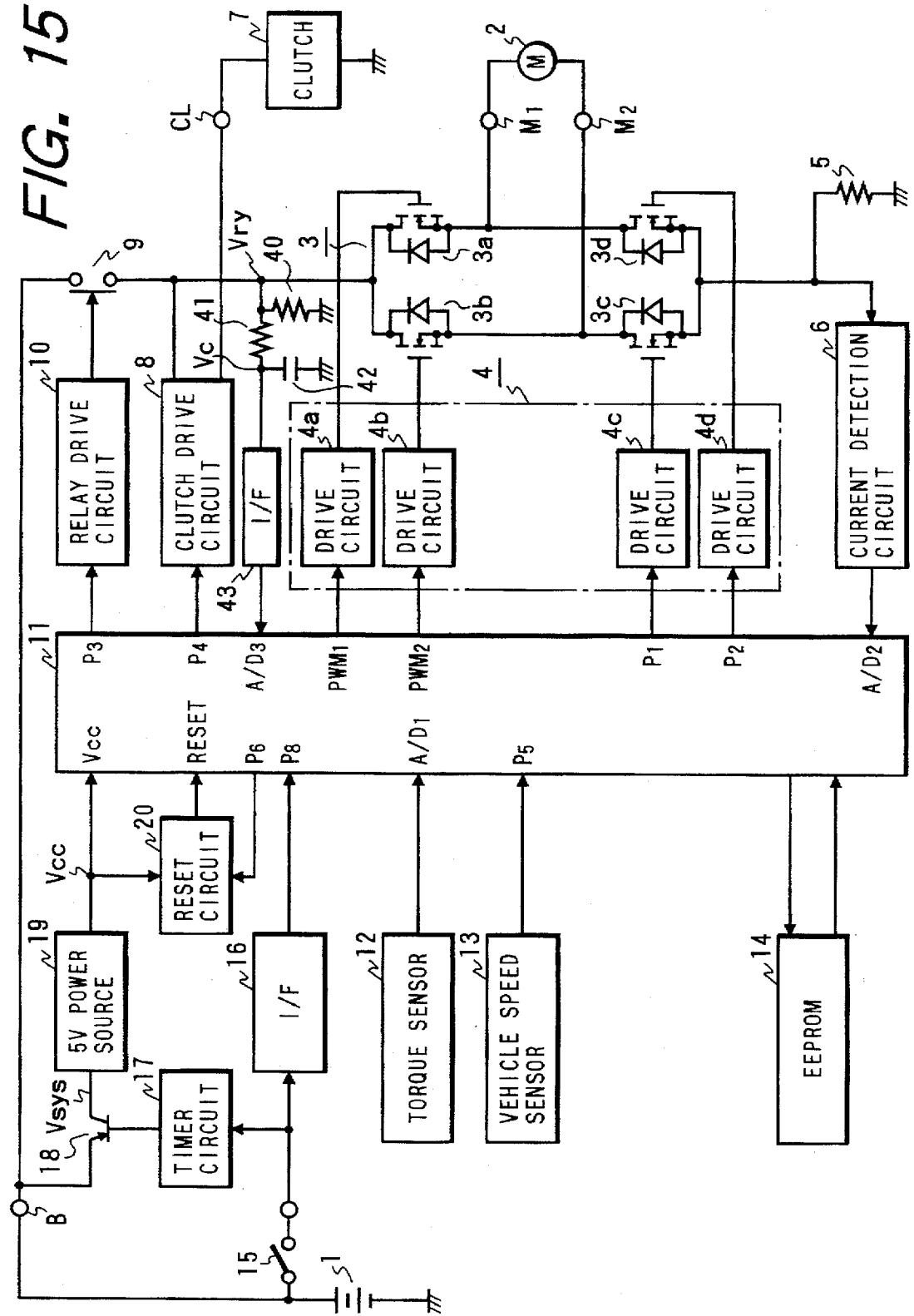
FIG. 15 is a block diagram showing the circuit configuration of the control apparatus for a vehicle according to the eighth embodiment of the present invention.

FIG. 15 is a block diagram showing the circuit configuration of the controller apparatus for a vehicle according to the eighth embodiment. In FIG. 15, like reference numerals refer to like or corresponding parts in the previous figures.

In FIG. 15, resistors 40, 41, capacitor 42 and interface 42 are added to the configuration shown in FIG. 1. The resistor 40 is connected to the relay 9 in its one end and connected to ground in its other end. The resistor 41 is connected, in its one end, to the one end of the resistor 40 and, in its other end, connected to the one end of the capacitor 42 and the interface 43. The other end of the capacitor 42 is connected to ground. The resistors 40, 41 and capacitor 42 constitute an integration circuit for integrating the power supplied through the relay 9. The interface 43 supplies the output from the integration circuit to the microcomputer 11 through the A/D port A/D 3.

With reference to FIGS. 16A–D and 17A–D, an explanation will be given of the operation of the integration circuit with reference to FIGS. 16A–D and 17A–D.

FIGS. 16A–D are timing charts for when the ignition switch 15 is turned on to actuate the power steering control apparatus. FIG. 16A shows the state of the ignition switch 15; FIG. 16B shows the output signal of the reset circuit 20; FIG. 16C shows the state of the relay 9; and FIG. 16D shows the voltage Vc at the capacitor 42. As seen these figures, after elapse of a predetermined time t2 from when the ignition switch 15 turns on, the reset circuit 20 changes the output signal (reset signal) from its L level to the H level. Thus, the processing of the microcomputer 11 is started and the relay 9 turns on soon. The turn-on of the relay 9 permits the power from the battery 1 to be supplied to the integration circuit. As a result, the voltage Vc at the capacitor 42 gradually increases at a predetermined charging time constant. Thereafter, the voltage Vc exceeds 1 V, which is a decision value, and increases until it reaches a predetermined value.

When the ignition switch 15 is turned off, the relay 9 turns off. Thus, the power supply to the integration circuit is stopped. As a result, the integration circuit starts its discharging at a predetermined time constant and is soon entirely discharged to zero.

On the other hand, FIGS. 17A–D are timing charts for when the microcomputer 11 has been reset in control. FIGS. 17A to 17D correspond to FIGS. 16A to 16D.

Since the control is being executed, the ignition switch 15 remains "on". It is assumed that the reset circuit 20 temporarily produces an L level output signal (FIG. 17B). Then, the relay 9 turns off and the integration circuit starts the discharging at a predetermined discharging time constant.

The microcomputer 11 is started again when the output signal from the reset circuit 9 is returned to the H level (FIG. 17B). Then, the relay 9 turns on again. As a result, power is supplied to the integration circuit through the relay 9. Thus, the integration circuit is charged so that the voltage Vc gradually increases at a predetermined charging time constant.

Now it should be noted that the charging time constant of the integration circuit is so set that the integration circuit is not discharged to a decision value or less while the relay 9 is "off". Specifically, even the reset occurs, the voltage Vc in the integration circuit is not lowered to 12 V or less.

For this reason, in the case of the reset during the control, the voltage Vc becomes a higher value than the decision value.

In the eighth embodiment, using the integration circuit described above, whether or not the microcomputer 11 has been reset in control is decided.

Figure 18:
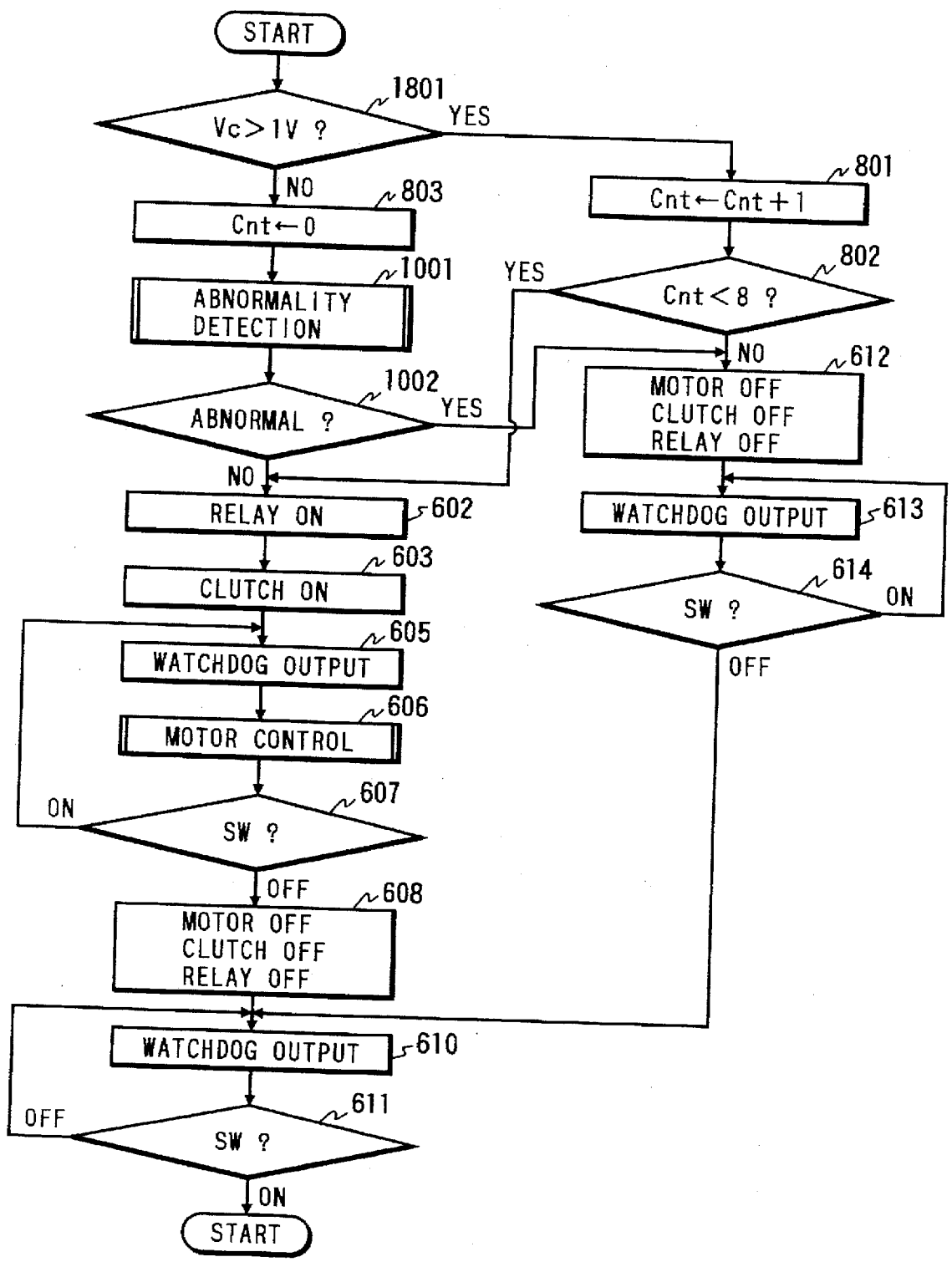
FIG. 18 is a flowchart showing the control according to the eighth embodiment of the present invention.

FIG. 18 is a flowchart Of the control according to the eighth embodiment of the present invention. In FIG. 18, like reference numerals refer to like or corresponding parts in the previous figures.

In step 1801, it is decided whether the voltage Vc in the integration circuit is higher or lower than 1 V which is the decision value. The decision timing is shown in FIGS. 16D and FIG. 17D. Namely, the decision is made at a timing after a predetermined time (time required for processing) from when the reset signal is changed from the L level to the H level so as to start the microcomputer 11, i.e. immediately after the level of the reset signal is changed.

When the integration circuit has not been charged, the voltage Vc is lower than 1 V. Such a case is considered to be the state where the ignition switch 15 is turned on to actuate the power steering control apparatus. In this case, therefore, in step 803, the counter cnt is cleared. In step 1001, the presence or absence of abnormality in the current path to the motor 2 is decided. Each processing described in the previous embodiments is successively executed to start the control of power steering.

On the other hand, when the integration circuit has been charged before the microcomputer 11 is started, the voltage Vc is higher than 1 V. Such a case is considered to be a state where the reset has been performed during the control. In this case, therefore, in steps 801 and 802, it is decided whether or not the reset during the control has been executed successively eight times. The subsequent processing described above follows.

In short, in this embodiment, in step 1801, it is decided whether the microcomputer 11 has been reset during in control on the basis of the output from the integration circuit. The step 1801 serves as state decision means.

In accordance with the eighth embodiment, without using the memory, it can be decided whether or not the microcomputer 11 has been reset in control.

What is claimed is:

1. A controller apparatus for a vehicle comprising:

a computer for controlling a device mounted in the vehicle;

a persistent memory which maintains contents stored therein when power is removed therefrom; and detector means for detecting the state of the computer immediately before the computer enters a reset state, said detection means comprising:

state detecting means for storing a first predetermined value in said persistent memory while said computer controls the device and storing a second predetermined value in said persistent memory when said computer completes control of the device; and state deciding means for deciding whether the computer is reset while controlling said device on the basis of the value stored in the persistent memory by the state detecting means, wherein said computer determines its processing contents on the basis of the detection result of said detection means immediately after said computer is started.

2. A controller apparatus according to claim 1, wherein said first predetermined value stored in said persistent memory is replaced by said second predetermined value when said second predetermined value is stored in said persistent memory.

3. A controller apparatus according to claim 2, wherein the operation of the computer is stopped after the state detecting means replaces the first value with the second value when an ignition switch is turned off.

4. A controller apparatus according to claim 1, wherein said detector means comprises plural state detecting means.

5. A controller apparatus according to claim 1, further comprising stopping means for stopping the control of the computer when the computer is reset a predetermined number of times.

6. A controller apparatus according to claim 5, further comprising:

failure decision means for deciding whether the device mounted in the vehicle can be controlled;

inhibiting means for inhibiting the control of the device when a failure is decided by said failure decision means; and decision result storage means for storing a decision result of said failure decision means.

7. A controller apparatus according to claim 1, further comprising initial abnormality detecting means for detecting the presence or absence of an abnormality in the controller apparatus before control is started, wherein when it is decided that the computer has been reset during the control, the control is immediately started and when it is decided that the computer has not been reset during the control, the control is started through said initial abnormality detecting means.

8. A controller apparatus according to claim 7, further comprising a running state detecting means for detecting a predetermined running state and when said computer is in a state other than said predetermined running state, starting the control through an initial abnormality detecting means even when it is decided that the reset has been performed during the control.

9. A controller apparatus according to claim 7, further comprising plural storage means for storing plural control values for the device mounted in the vehicle and storage decision means for deciding whether or not the storage contents of the plural storage means are correct and starting the control through the initial abnormality detecting means when it is decided that any one of the storage contents is erroneous.

10. A controller apparatus for a vehicle comprising:

a computer for controlling a device mounted in the vehicle;

an integrator circuit outputting a voltage according to a time constant; and means for starting charging of said integrator circuit simultaneously with said computer starting control of the device and starting discharging of said integrator circuit simultaneously with said computer completing control of the device; and state decision means for deciding whether said computer has been reset while controlling the device based on the output from said integrator circuit after a predetermined time from when said computer is started.

\* \* \* \* \*